(12) United States Patent
Genin

(10) Patent No.: US 6,915,355 B2
(45) Date of Patent: Jul. 5, 2005

(54) AUTOMATION EQUIPMENT EQUIPPED WITH A USB LINK FOR MONITORING AND CONTROL IN AN AUTOMATION APPLICATION

(75) Inventor: Jean-Jacques Genin, Nice (FR)

(73) Assignee: Schneider Automation, Valbonne (FR)

( * ) Notice: Subject to any disclaimer, the term of this patent is extended or adjusted under 35 U.S.C. 154(b) by 45 days.

(21) Appl. No.: 10/231,280

(22) Filed: Aug. 30, 2002

(65) Prior Publication Data

US 2003/0061411 A1 Mar. 27, 2003

(30) Foreign Application Priority Data

Sep. 3, 2001 (FR) .............................................. 01 11507

(51) Int. Cl.[7] ................................................. G06F 3/00
(52) U.S. Cl. ........................... 710/6; 710/62; 710/100; 710/313; 701/29
(58) Field of Search ............................. 710/6, 62, 100, 710/313; 701/29

(56) References Cited

U.S. PATENT DOCUMENTS 6,282,469 B1 * 8/2001 Rogers et al. ................ 701/29
6,308,215 B1 * 10/2001 Kolbet et al. ................ 709/233
6,405,139 B1 * 6/2002 Kicinski et al. ............... 702/33
6,408,351 B1 * 6/2002 Hamdi et al. .................. 710/63
6,412,028 B1 * 6/2002 Steed et al. .................... 710/22
6,590,648 B1 * 7/2003 von Orelli et al. ........... 356/328
6,594,717 B2 * 7/2003 Rasmussen et al. ......... 710/100

OTHER PUBLICATIONS

U.S. Appl. No. 09/986,641, filed Nov. 9, 2001, unknown.

* cited by examiner

*Primary Examiner*—Jeffrey Gaffin
*Assistant Examiner*—Niketa Patel
(74) *Attorney, Agent, or Firm*—Oblon, Spivak, McClelland, Maier & Neustadt, P.C.

(57) ABSTRACT

Automation equipment executes a real-time program for carrying out monitoring/control in an automation application. The automation equipment includes a USB connector connected via a USB bus driver circuit to an internal bus. The automation equipment also includes a software task in charge of controlling a flow of communications exchanged via the USB connector with remote equipments. The characteristics of the application program are executed in the automation equipment.

Figure 1:
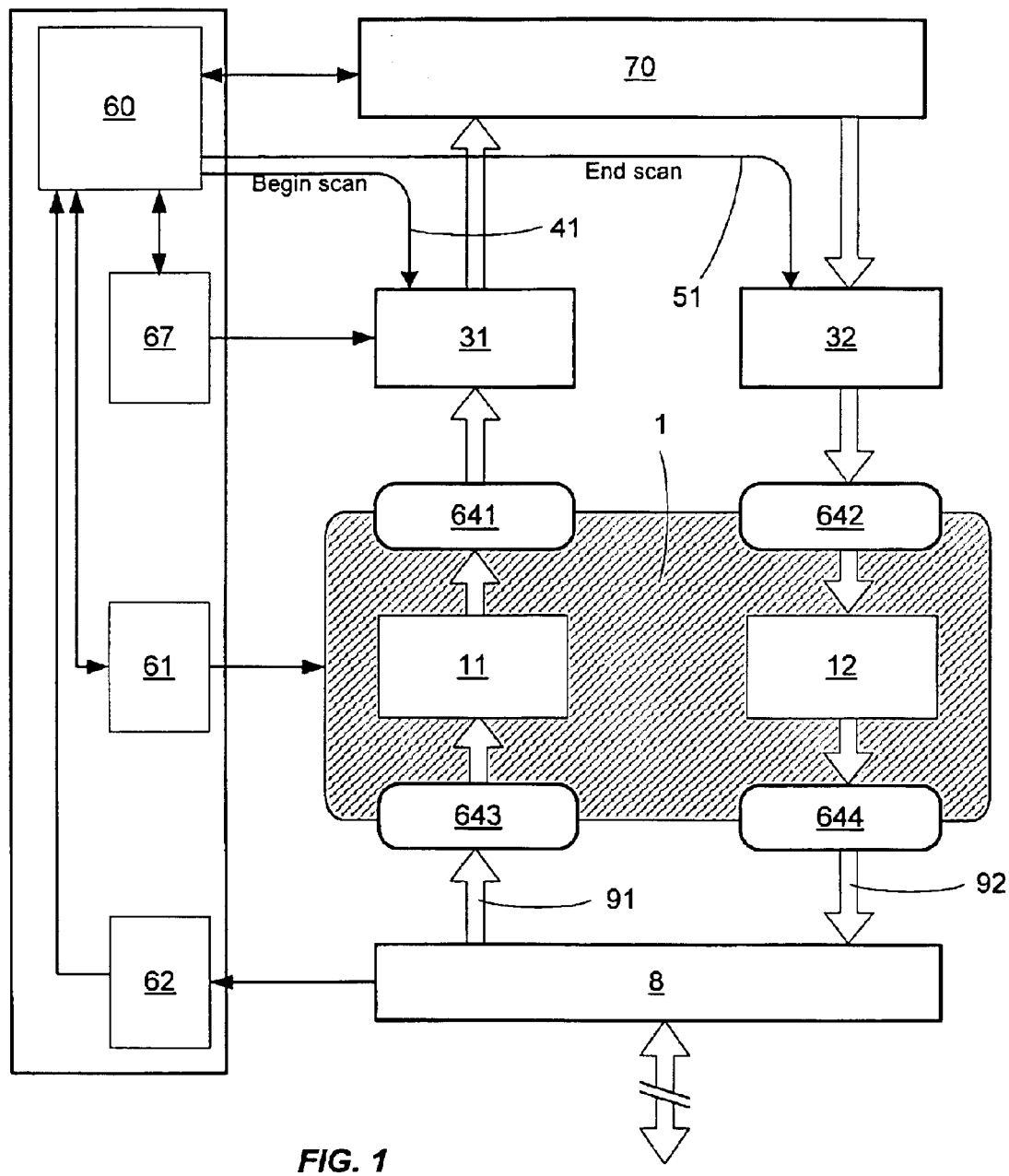

23 Claims, 2 Drawing Sheets ns or PC type equipments are
AUTOMATION EQUIPMENT EQUIPPED WITH A USB LINK FOR MONITORING AND CONTROL IN AN AUTOMATION APPLICATION The present invention relates to an automation equipment equipped with a USB (Universal Serial Bus) type link for connecting one or several remote equipments.

More and more terminals or PC type equipments are equipped with USB type links which simplify the connection of remote equipments, and provide much higher throughput than the usual series links. Further, with this link, the bandwidth may be distributed according to communications needs. The openness and the flexibility provided by this link should however not disturb the real-time operation of automation equipments which use it.

An automation equipment refers hereafter to a programmable logic controller, a monitoring/control station, a digital control or any equipment which may contain and execute an application program in order to carry out one or several monitoring and/or control functions of all or part of an automation application for example pertaining to the field of industrial process automation, building automation or the monitoring/controlling of electrical distribution networks.

The use of such a type of link on an automation equipment would provide improvement in the data transfer rate between this automation equipment and remote equipments, such as peripherals, terminals, programming, diagnostic, supervision systems, other automation equipments or others. With this, the communication problems with the PC type computer world may also be resolved. Indeed, the traditional series links are software-driven and the behavior over time is changed by other software packages, the execution of which has more priority, such as anti-virus software packages, screen savers, etc. . . . In the case of a USB network, the link layer corresponding to level 2 of the ISO communications model is managed by a dedicated hardware component, its operation also becomes independent of the other software tasks which are executing on the equipment.

Advantageously, this use also enables standard connection means from the PC computer world to be adopted on automation equipment, which would simplify the connection and therefore reduce the implementation costs.

However, the important throughput available with a USB type link should not disturb the operation of the automation equipment's application program. If the small bandwidth of asynchronous series links induces a flow without any consequences on the real-time operation of the automation equipment, this is no longer the case with a very fast link, it therefore becomes imperative to adapt the incoming flow to the real-time needs and constraints of the application under control.

The problem essentially occurs upon receiving messages. The static allocation of bandwidth would lead to a notable reduction in the performances of the system by reducing its reactivity. Indeed, in order to meet instantaneous needs, for adjustments for example, communication channels which are unused for most of the time, should be reserved. Thus, the admissible throughput on the terminal socket of a piece of automation equipment should be calibrated according to the constraints of the application. The number of admissible messages per cycle—time unit of the application—on the terminal socket of the automation equipment depends on the model of the automation equipment. Indeed, an upper range model which manages high-volume applications should be able to provide a much higher throughput than a low end range model, notably for meeting the needs of supervisors.

Further, the throughputs may vary according to the automation applications because the number of executed cycles per second of an application program in an automation equipment is also related to the type of application. For example, for an automation application relating to the monitoring/control of a machine, the cycle time is generally less than 10 ms whereas that of a feedback control application is rather of the order of 100 ms. In the latter case, the number of messages treated per unit time will therefore be smaller.

The object of the invention is therefore to provide the use of a USB link on an automation equipment while overcoming one or more drawbacks of the prior art.

This object is achieved by an automation equipment executing a real-time application program in order to carry out one or more monitoring or control functions in an automation application, and having random access memory, which includes a USB type connector connected via a USB bus driver circuit to an internal bus of the automation equipment and a software task executed by the central processing unit of the automation equipment and in charge of controlling the flow of communications exchanged on the USN connector between the automation equipment and the remote equipments, with the characteristics of the executed application program in the automation equipment.

According to one feature, the software task is periodically activated by a time base of the automation equipment and it processes the transmitting portion by triggering a frame builder module.

According to another feature, the software task is triggered upon receiving a communications message by an interrupt from the USB bus driver circuit, and it includes a message builder module for the application program, after synchronization with the time base of the automation equipment.

According to another feature, the message builder converts the USB frames into messages expressed in the format of the operating system of the automation equipment and understandable to the application and vice versa for the frame builder.

According to another feature, the software task utilizes a first variable memory area of the automation equipment's random access memory, declared as a stack for receiving input frames and as a stack for receiving output messages, the size of the first memory area being defined for the input frame receiving stack by design and for the output message receiving stack by parameterization. The software task utilizes a second variable memory area of the automation equipment's random access memory, declared as a stack for transmitting output frames and as a stack for transmitting input messages, the size of the second variable memory area being allocated for the output frame transmitting stack by design and for the input message transmitting stack by parameterization.

According to another feature, the software task includes a parameterization module which comprises a software function for parameterizing memory areas used as a stack for transmitting input messages and as a stack for receiving output messages.

According to another feature, the software task includes a module for managing incoming messages to the application program and a module for managing the outgoing messages from the application program.

According to another feature, the incoming message manager module limits the number of read messages at the beginning of a cycle of the application program to a determined value (for example, four messages per cycle for a medium range model of automation equipment).

According to another feature, the automation equipment includes a driver which triggers the reading of incoming messages at the beginning of the cycle of the application program, and triggers the writing of outgoing messages at the end of the cycle of the application program and before the beginning of the next cycle.

Figure 2:
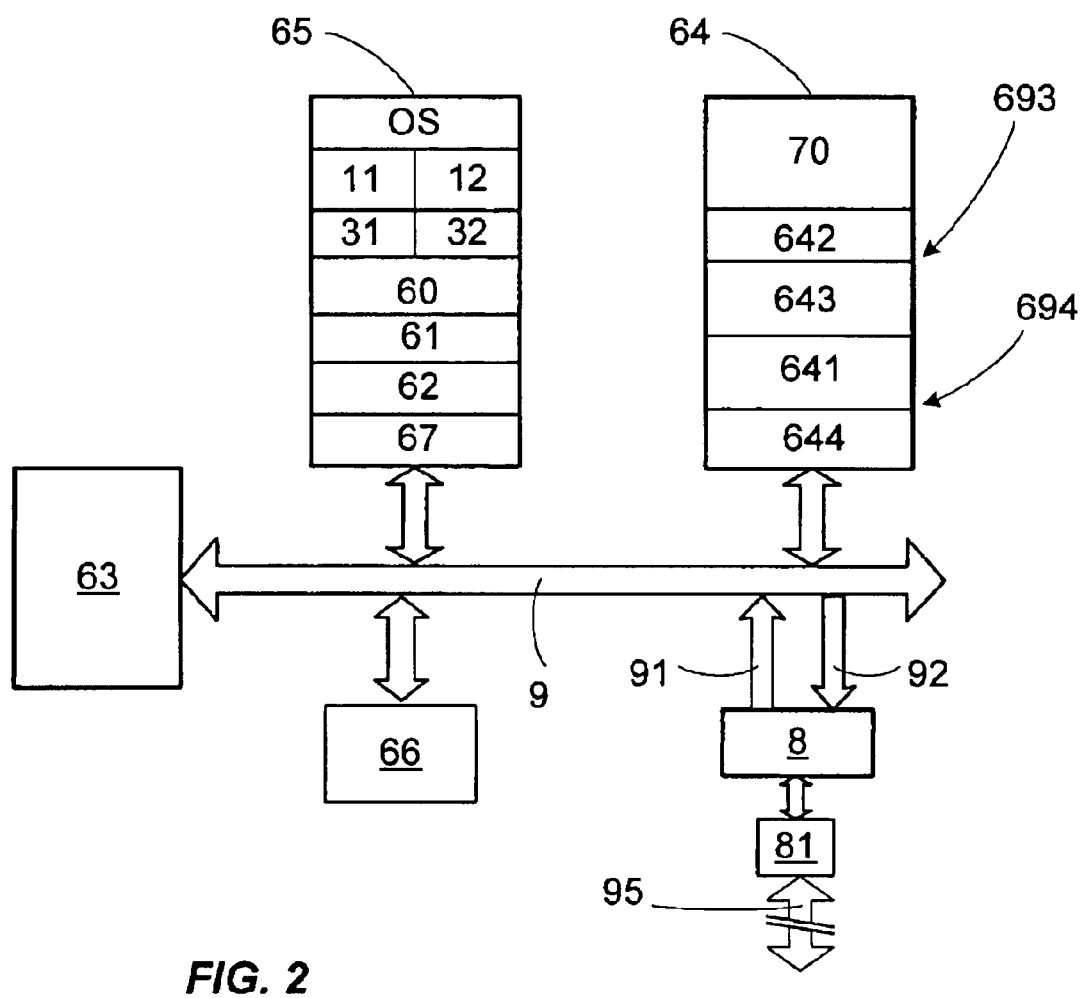

Other features and advantages of the invention will become more clearly apparent upon reading the description hereafter with reference to an illustrative, but non-limiting embodiment of the invention, illustrated in the drawings hereafter wherein:

FIG. 1 shows the diagram of a communications architecture of an automation equipment as defined according to the invention, FIG. 2 schematizes an exemplary architecture of such an automation equipment.

The invention will be described with reference to FIGS. 1 and 2. The invention relates to an automation equipment equipped with a USB type connector (81, FIG. 2), not shown in FIG. 1, which communicates with one or more external remote equipments via a link (95, FIG. 1). This USB type connector (81) is connected to a USB bus driver circuit (8). This USB bus driver circuit (8) communicates with the internal bus (9) of the automation equipment, at the input via the link (91), at the output via the link (92) of the internal bus (9) of the automation equipment. The conventional structure of an automation equipment is illustrated in FIG. 2 and generally consists of a central processing unit (63) consisting of one or more processors, of a fixed memory (65) of the unchangeable ROM type or of the changeable FLASH-PROM type which will be referred to as read-only memory, subsequently. This read-only memory (65) contains the manufacturer program called the operating system (OS). This manufacturer program is generally expressed in a language specific to the manufacturer. The automation equipment also includes a random access memory (64) which communicates like the read-only memory (65), with the central processing unit (63) via the internal bus (9). An input/output manager (66) of the automation equipment is also connected to the internal bus (9) and communicates with the central processing unit (63). The random access memory (64) contains in a first area the real-time program of the application (70) as developed by the user, called the application program hereafter, in a second area, the data, in particular the images of the states of the couplers and the constants relative to the application program developed by the user.

As a reminder, the application program is executed by the central processing unit (63) and is in charge of monitoring and/or controlling an automation application by means of inputs/outputs driven by the input/output manager (66) and the application program. The application program elaborated by the designer/user is usually written is one or more automation graphic languages, notably integrating ladder diagrams, sequential function charts also called Grafcet, function block descriptions and/or instruction lists (IL).

In addition to the information specific to the automation application which consists of the application program, the data and the input/output stored in the random access memory (64), the invention describes the possibility of allocating variable memory areas (693, 694) of the random access memory (64). With a first variable memory area (693), a FIFO stack (642) for receiving the output messages and a FIFO stack (643) for receiving the input frames may be formed and with a second variable memory area (694), a FIFO stack (641) for transmitting input messages and a FIFO stack (644) for transmitting output frames may be formed. The size of the first memory area (693) is defined for the input frame receiving stack (643) by design and for the output message receiving stack (642) by parameterization. The size of the second memory area (694) is defined for the output frame transmitting stack (644) by design and for the input message transmitting stack (641) by parameterization. The sizes of the frame transmitting and receiving stacks (643, 644) are therefore set by the manufacturer of the automation equipment, for example, according to the model of the automation equipment. On the other hand, with a parameterization by the user, the sizes of the message transmitting and receiving stacks (641, 642) may be defined for example according to the type of controlled automation application.

In addition to the conventional components of an operating system of a standard automation equipment, the ROM memory or the PROM memory will comprise a certain number of software modules, the function of which will be explained hereafter.

A first module (60) plays the role of driver or scan manager.

A second module (62) for managing interrupts (interrupt manager) manages interrupts from the USB bus driver circuit (8).

A third module (61) manages the system time base and triggers the activation of a software module (1) for processing the USB messaging system, mainly including a message builder module (11) for the incoming communications and a frame builder module (12) for the outgoing communications. These modules (11, 12) are stored in the read-only memory (65) and are part of the operating system (OS). The message builder module (11) and the frame builder module (12) respectively have the incoming frames comply with the message format for the application program and vice versa, the messages from the application program intended to be transformed into frames at the output and then transmitted to the USB bus.

The driver (60) which converses with the application program (70) generates an end scan signal (51) at the end of each cycle of the application program. This signal (51) provides triggering of a outgoing message manager module (32), which will receive the information for filling the receiving stack (642) for the output messages to be transmitted. Also, in order to guarantee consistence in the messages, the driver (60) also transmits at the beginning of each cycle of the application program, a begin scan signal (41) which triggers a incoming message manager module (31) in order to allow messages from the incoming message transmitting stack (641) to be transmitted to the application program (70). The incoming (31) and outgoing (32) message manager modules are part of the operating system (OS) stored in the read-only memory (65) of the automation equipment.

Thus, as indicated in FIG. 1, the input frame receiving stack (643) is used as a buffer memory between the USB bus driver (8) and the message builder (11) and the input message transmitting stack (641) is used as a buffer memory between the message builder (11) and the incoming message manager (31). Also, the output message receiving stack (642) is used as a buffer memory between the outgoing message manager (32) and the frame builder (12) and the output frame transmitting stack (644) is used as a buffer memory between the frame builder (12) and the USB bus driver (8).

A fourth parameterization module (67) includes a parameterization software function enabling a user to configure a predetermined limiting value for the number of messages able to be received at the beginning of a cycle of the application program (70) by the automation equipment memory. This limiting value notably determines the size of the memory area assigned to the input message transmitting stack (641). The parameterization module (67) provides this information to the incoming message manager module (31) in order to allow it to limit the number of messages to be received at the beginning of a cycle. Also, the parameterization module (67) is also capable of enabling a user to configure a predetermined limiting value for the number of messages able to be transmitted at the end of the cycle of the application program (70). This limiting value will notably determine the size of the memory area allocated to the output message receiving stack (642).

The USB message system processing module (1) is triggered, periodically, for example about every millisecond. This module provides two essential functions: fragmentation/defragmentation of the USB frames and control of the throughput.

Defragmentation consists in converting 64 byte USB frames into messages understandable to the application program and vice-versa, fragmentation consists in converting messages understandable to the application program into 64 byte USB frames.

A message generally comprises several frames. When the task for processing the USB message system is enabled, it starts by processing the transmitting portion in order to free internal memory resources. Indeed, the flow generated by the automation equipment is generally considerably less than the receiving capacities of the remote equipments having USB type communication means. The receiving phase starts with a test for the available space in the entry message transmitting stack (641). When there is no room for storing at least one message in the stack (641), the message builder (11) finishes its processing without unstacking the entry frame receiving stack (643). When there is room for storing at least one message in the stack (641), the message builder (11) unstacks the stack (643) and converts the USB frames into an entry message stored in the stack (641).

The flow control is therefore under the control of the driver software module (60), itself under the control of the internal time base (61) of the automation equipment and triggered by an interrupt manager signal (62). The messages are built by the message builder (11) and defragmented only when the random access memory resources (64) are available and the managing of the FIFO stack areas (641–644) of the random access memory (64) is controlled by the application program (70).

The USB bus driver (8) operates in stand-alone mode by triggered interrupts, either by the arrival of a frame, or by the end of the transmission of the previous frame. The mechanism for the standard negative acknowledgment to a USB type communication is involved automatically when all the resources are busy upon reception. This negative acknowledgment is transmitted by the USB bus driver (8) when an interrupt triggered by the arrival of a frame was not able to be processed by the USB message system processing module (1) (when the input frame receiving FIFO stack (643) is full) and the driver (60). It is then up to the transmitter not shown to adopt a consistent behavior with the admissible throughputs via the link (95), for example by temporarily reducing the requests.

It should be obvious for those skilled in the art that the present invention provides embodiments under many other specific forms without departing from the field of application of the invention as claimed. Accordingly, the present embodiments should be considered by way of illustration but may be changed within the field defined by the scope of the appended claims.

I claim:

1. An automation equipment including:
    an application program configured to carry out one or more monitoring or control automation functions;
    a random access memory including a first variable memory area operating as an input frame stack and as an output message stack;
    a USB bus driver circuit;
    an internal bus connected to the random access memory and the USB bus driver circuit;
    a USB connector connected via the USB bus driver circuit to the internal bus; and
    a software task in charge of controlling a flow of first communications transmitted over the USB connector and a flow of second communications received over the USB connector and stored in the input frame stack,
    wherein the software task is configured to retrieve the first communications from the output message stack, format the first communications for transmission over the USB connector, retrieve the second communications from the input frame stack and format the second communications for use by the application program.

2. The automation equipment according to claim 1, wherein the software task is periodically activated by a time base and formats the first communications transmitted by triggering a frame builder module.

3. The automation equipment according to claim 1, wherein the software task is triggered by an interrupt from the USB bus driver circuit upon receiving the second communications after synchronization with a time base, and the software task includes a message builder module to format the second communications for the application program.

4. The automation equipment according to claim 2, further comprising:
    an operating system,
    wherein the message builder formats the second communications by converting USB frames into messages expressed into a format of the operating system and understandable to the application program.

5. The automation equipment according to claim 4, wherein a size of the input frame stack is allocated by design and a size of the output message stack is allocated by parameterization.

6. The automation equipment according to claim 4, wherein the software task utilizes a second variable memory area of the random access memory operating as an output frame stack and as an input message stack, a size of the output frame stack being allocated by design and a size of the input message stack being allocated by parameterization.

7. The automation equipment according to claim 6, wherein the software task includes a parameterization module which comprises a software function for parameterizing variable memory areas used as the output message stack and as the input message stack.

8. The automation equipment according to claim 7, wherein the software task includes a first module for managing incoming messages to the application program and a second module for managing output messages from the application program.

9. The automation equipment according to claim 8, wherein the first module for managing the incoming messages limits a number of messages read at a beginning of a cycle of the application program to a determined value.

10. The automation equipment according to claim 8, further comprising:
a driver which triggers reading of the incoming messages at a beginning of a cycle of the application program and triggers writing of the output messages at an end of the cycle of the application program and before a beginning of a next cycle.

11. The automation equipment according to claim 2, further comprising:
an operating system,
wherein the frame builder converts messages expressed in a format of the operating system and understandable to the application program into USB frames.

12. An automation equipment including:
means for monitoring or controlling automation functions;
means for randomly storing and retrieving data including a first variable portion for storing and retrieving data as a means for receiving an output message and a means for receiving an input frame;
means for connecting to and driving a USB bus; and
means for controlling a flow of first communications transmitted over the means for connecting and a flow of second communications received over the means for connecting, the means for controlling further for retrieving the first communications from the means for receiving the output message and to format the first communications for transmission over the means for connecting, for retrieving the second communications from the means for receiving the input frame and for formatting the second communications for use by the means for monitoring or controlling.

13. The automation equipment according to claim 12, wherein the means for controlling is periodically activated by a time base and formats the first communications transmitted to remote equipment by triggering a frame builder module.

14. The automation equipment according to claim 12, wherein the means for controlling is triggered by an interrupt from the means for connecting to and driving a USB bus upon receiving the second communications after synchronization with a time base, and the means for controlling includes a message builder module to format the second communications for the means for monitoring or controlling.

15. The automation equipment according to claim 13, further comprising:
an operating system,
wherein the message builder formats the second communications by converting USB frames into messages expressed into a format of the operating system and understandable to the means for monitoring or controlling.

16. The automation equipment according to claim 15, wherein a size of the means for receiving the input frame is allocated by design and a size of the means for receiving the output message is allocated by parameterization.

17. The automation equipment according to claim 15, wherein the means for controlling utilizes a second variable portion of the means for randomly storing and retrieving data as a means for transmitting an output frame and as a means for transmitting an input message, a size of the means for transmitting the output frame being allocated by design and a size of the means for transmitting the input message being allocated by parameterization.

18. The automation equipment according to claim 17, wherein the means for controlling includes a parameterization module which comprises a software function for parameterizing variable areas of the storing and retrieving means used as a means for receiving the output message and as a means for transmitting the input message.

19. The automation equipment according to claim 18, wherein the means for controlling includes a first module for managing incoming messages to the means for monitoring or controlling and a second module for managing output messages from the means for monitoring or controlling.

20. The automation equipment according to claim 19, wherein the first module for managing the incoming messages limits a number of messages read at a beginning of a cycle of the means for monitoring or controlling to a determined value.

21. The automation equipment according to claim 19, further comprising:
means for triggering the reading of the incoming messages at a beginning of a cycle of the means for monitoring or controlling and for triggering the writing of the output messages at an end of the cycle of the means for monitoring or controlling and before a beginning of a next cycle.

22. The automation equipment according to claim 13, further comprising:
an operating system,
wherein the frame builder formats the second communications by converting messages expressed in a format of the operating system and understandable to the means for monitoring or controlling into USB frames.

23. A computer program product embodied in a computer readable medium containing program code for execution on a computer system, said program code including:
a first program code to monitor or control automation functions;
a second program code to randomly store and retrieve data, said first program code including storing and retrieving an input frame and storing and retrieving an output message;
a third program code to connect to and drive a USB bus; and
a fourth program code to control a flow of first communications transmitted over the USB bus and a flow of second communications received over the USB bus, and wherein the fourth program code utilizes the second program code to retrieve the first communications, format the first communications for transmission over the USB bus, retrieve the second communications and format the second communications for use by the first program code.

* * * * *